UNITED STATES PATENT OFFICE.

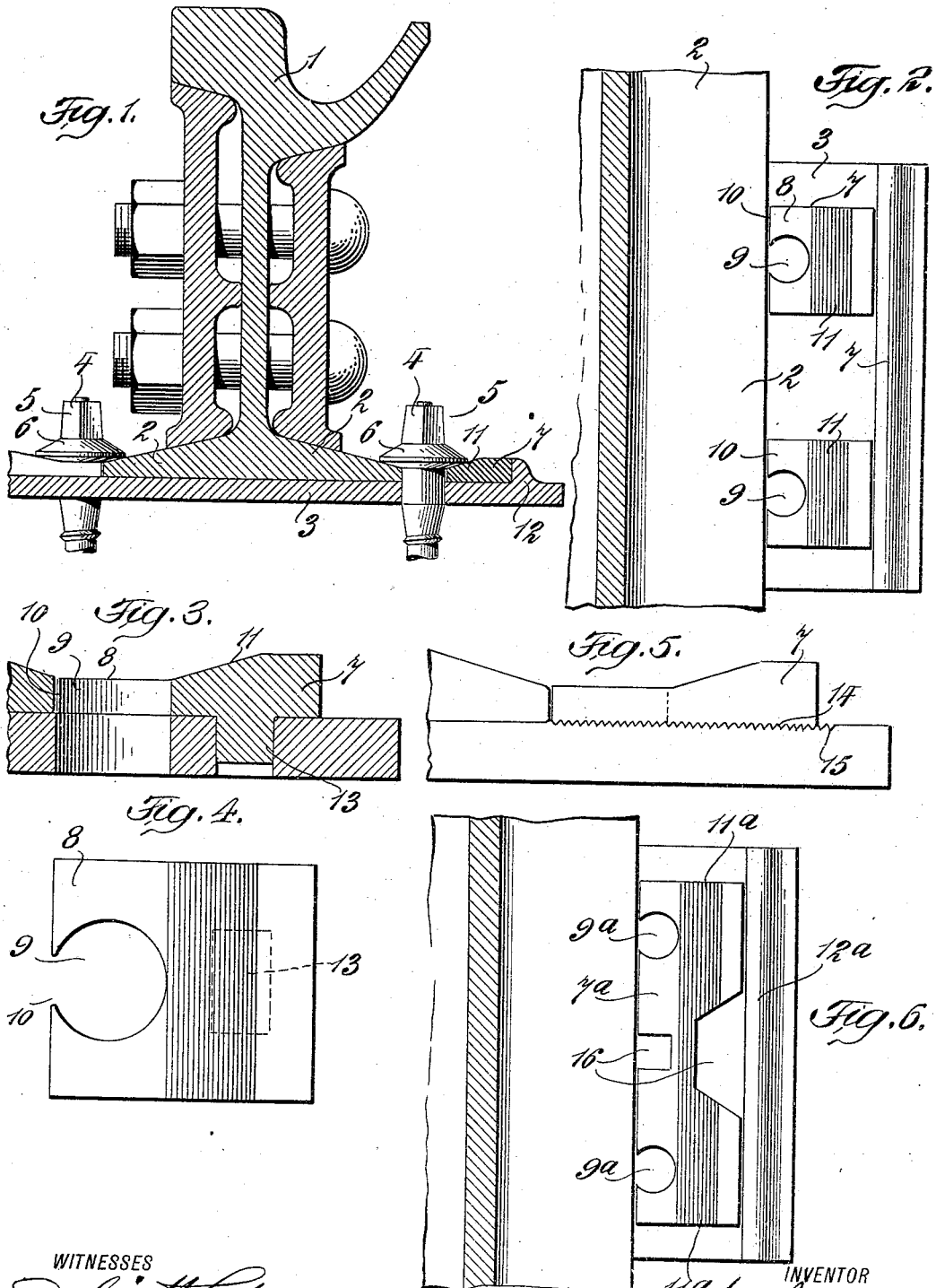

GEORGE L. HALL, OF NEW YORK, N. Y.

WASHER FOR SCREW-BOLTS.

946,127.  Specification of Letters Patent.  Patented Jan. 11, 1910.

Application filed May 17, 1909. Serial No. 496,568.

*To all whom it may concern:*

Be it known that I, GEORGE L. HALL, a citizen of the United States, and resident of the borough of Manhattan, city, county, and State of New York, have invented certain new and useful Improvements in Washers for Screw-Bolts, of which the following is a specification, reference being had therein to the accompanying drawing, in which—

Figure 1 is a transverse vertical sectional view of a railroad rail showing my improved washer in position; Fig. 2 a plan view showing a pair of washers arranged in position on a tie-plate and against the base flange of a railroad rail; Fig. 3 is a vertical sectional view of a slightly modified form of washer; Fig. 4 is a plan view of the form shown in Fig. 3; Fig. 5 is a side elevation showing a washer having a serrated under surface and a tie-plate having a serrated upper surface; and Fig. 6 a plan view showing the washer having two openings for screw bolts and adapted for use on the tie-plate.

Ordinarily screw bolts as employed in railroad work and particularly for securing rails in position are used without washers. The result is that many times the bolts are tilted outwardly and away from the rail base to such an extent as to lessen their clamping effect upon the rail, the head of the bolt acting as a cam to force the bolt head outwardly.

It is the main object of this invention to provide a washer adapted to maintain the bolt in an upright position while at the same time permitting the head thereof to fit closely against and securely clamp the rail base.

Another object of the invention is to provide means whereby the washer will be held against outward movement so that the clamping action of the screw bolt head will not force the washer outwardly or away from the base of the rail and away from the bolt head and will also prevent the washer binding against the bolt.

Referring to the various parts by numerals, 1 designates the track rail which may be of any suitable form, having the base flange 2.

3 designates a tie-plate which may be of any desired construction and 4 screw bolts having the squared upper ends 5 to receive a wrench. The screw bolts are formed with the clamping heads 6 which are beveled downwardly and inwardly on their under sides, the bevel corresponding with the inclination of the upper surfaces of the rail base. The bolts are screwed vertically into the tie close to the edge of the base of the rail so that the beveled under side of the head 6 clamps the upper surface of the rail base, as shown clearly in Fig. 1.

To prevent the head of the bolt, and the bolt itself, from being tilted or inclined outwardly when the head 6 contacts with the rail base, I employ a washer 7. This washer consists of a plate having a thin portion 8 of substantially the same thickness as the edge of the base flange rail, said thin portion being perforated at 9 to receive the screw bolt. The perforation 9 is formed at the edge of the thin portion 8 of the washer, and extends inwardly from said edge in the nature of a substantially circular slot. The longest dimension of the slot perforation 9 is parallel with the thin edge of the washer and is greater than the width of the entrance to said slot, the perforation being enlarged inwardly from the thin edge of the washer. The purpose of this is that the washer may surround the bolt except where the bolt is in contact with the rail edge and the bolt will prevent the outward movement of the washer. The edge 10 of the washer is adapted to bear on the edge of the rail base and the portion 8 of the washer is of substantially the same thickness as the edge of the rail base, or of slightly less thickness so that the bolt head may be brought into position for clamping engagement with the rail base. The washer is formed with the upwardly and outwardly inclined surface 11 which corresponds to the inclination of the under side of the bolt head and to the inclination of the upper surface of the rail base. The bolt head contacts with this inclined surface 11 at a point diametrically opposite its point of engagement with the rail base. It will thus be seen that the bolt will be maintained in an upright position and that the bolt head will be maintained in its proper and most effective clamping position with respect to the rail base.

I provide additional means for preventing the washer moving outwardly or away from the rail base, said means also preventing the washer engaging the bolt. I have shown various devices for this purpose. As shown in Fig. 1, the tie-plate 3 is formed with an abutment 12 against which the outer side of the washer bears. In Fig. 3 the washer is provided with a depending lug 13 which is adapted to enter a suitable aperture in the tie-plate or in the tie. In Fig. 5 the washer is serrated on its under side as shown at 14. The tie-plate may be serrated if desired, as shown at 15, to register with the serrations on the washer.

It will be readily understood that if desired the washer may be provided with two bolt holes as shown in Fig. 6 for convenience in handling when two bolts are used in each tie or through each tie-plate. In Fig. 6, 7ª is a washer provided with the two openings 9ª and the inclined portion 11ª. The tie-plate is formed with the upwardly extending abutment 12ª. The washer 7ª is cut out as at 16 merely to save metal and to reduce the weight of the washer.

It will thus be seen that by the use of my improved washer screw bolts will be held in proper position to secure the most effective clamping effect of the head. It will also be noted that by maintaining the screw bolt in its vertical position and by preventing it from tilting or inclining outwardly the aperture formed in the tie by the bolt will not be unnecessarily enlarged, thereby insuring a tight fit for the bolts and reducing the liability of the bolts working loose.

It is of advantage to provide means to hold the washer in its proper relation with the bolt as it insures the proper clamping action between the bolt head and the rail base and prevents the washer contacting with the bolt.

Having thus described my invention, what I claim as new and desire to secure by Letters Patent is:—

1. A washer for a screw bolt provided with a thin portion formed with a substantially circular slot therein, said slot extending inwardly from the edge of the thin portion and adapted to receive a bolt and to permit said bolt to bear against the edge of a rail base, said washer being also formed with an upwardly and outwardly inclined portion to receive the under side of the bolt head, said inclined portion being directly opposite the slot opening, the thin portion of the washer being of substantially the same thickness as the edge of the rail base, and the inclined portion corresponding in inclination to the upper surface of said base.

2. A washer for a screw bolt provided with a thin portion having a straight edge adapted to bear against the rail base and formed with a substantially circular slot therein, said slot extending inwardly from the straight edge of the thin portion and adapted to receive the bolt and permit said bolt to bear against the edge of the rail base, said washer being also formed with an upwardly and outwardly inclined portion to receive the under side of the bolt head, said inclined portion being directly opposite the slot opening, the thin portion of the washer being of substantially the same thickness as the edge of the rail base, and the inclined portion corresponding in inclination to the upper surface of said base.

3. A washer for a screw bolt provided with a thin portion, a slot therein extending inwardly from the edge of the thin portion and adapted to receive the bolt and to permit said bolt to bear against the edge of the rail base, said washer being also formed with an upwardly and outwardly inclined portion to receive the under side of the bolt head, said inclined portion being opposite the slot opening, and means beyond the slot opening to prevent the outward movement of the washer.

4. A washer for a screw bolt provided with a thin portion, a slot therein extending inwardly from the edge of the thin portion and adapted to receive the bolt and to permit said bolt to bear against the edge of the rail base, said washer being also formed with an upwardly and outwardly inclined portion to receive the under side of the bolt head, said inclined portion being opposite the slot opening, and means to prevent the outward movement of the washer.

5. The combination of a screw bolt washer provided with a thin portion formed with a slot extending inwardly from the edge of the thin portion and adapted to receive a bolt and to permit said bolt to bear against the edge of a rail base, said washer being also formed with an upwardly and outwardly inclined portion to receive the under side of the bolt head, said inclined portion being opposite the slot opening, a tie-plate apertured to receive the bolt, and means to prevent the outward movement of the washer on the tie-plate.

6. A washer for a screw bolt provided with a thin body portion formed with a slot therein, said slot extending inwardly from the edge of the thin portion and adapted to receive a bolt and to permit said bolt to project slightly beyond the thin edge of the washer, said slot enlarging inwardly from the said thin edge of the washer whereby the entrance to the slot will be of less width than the slot, and an upwardly and inwardly inclined portion formed on said washer to receive the under side of the bolt head, said inclined portion being directly opposite the slot opening.

In testimony whereof I hereunto affix my signature in the presence of two witnesses this 14th day of May 1909.

GEORGE L. HALL.

Witnesses:
W<small>M</small>. R. D<small>AVIS</small>,
E. H. K<small>AUFMANN</small>.